US009265071B2

(12) United States Patent
Chang et al.

(10) Patent No.: US 9,265,071 B2
(45) Date of Patent: Feb. 16, 2016

(54) SIGNALLING METHOD FOR DIRECT COMMUNICATION BETWEEN TERMINALS

(71) Applicant: ELECTRONICS AND TELECOMMUNICATIONS RESEARCH INSTITUTE, Daejeon (KR)

(72) Inventors: Sung Cheol Chang, Daejeon (KR); Mi Young Yun, Daejeon (KR); Seokki Kim, Gyeonggi-do (KR); Won-Ik Kim, Daejeon (KR); Hyun Lee, Daejeon (KR); Sung Kyung Kim, Daejeon (KR); Chul Sik Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 128 days.

(21) Appl. No.: 13/937,898

(22) Filed: Jul. 9, 2013

(65) Prior Publication Data
US 2014/0017991 A1 Jan. 16, 2014

(30) Foreign Application Priority Data

Jul. 10, 2012 (KR) .................. 10-2012-0075228
Jul. 9, 2013 (KR) .................. 10-2013-0080591

(51) Int. Cl.
*H04W 76/00* (2009.01)
*H04W 76/02* (2009.01)
*H04W 76/04* (2009.01)
*H04W 76/06* (2009.01)

(52) U.S. Cl.
CPC ............ *H04W 76/00* (2013.01); *H04W 76/023* (2013.01); *H04W 76/043* (2013.01); *H04W 76/068* (2013.01)

(58) Field of Classification Search
CPC . H04W 76/00; H04W 76/023; H04W 76/043; H04W 76/068
USPC ........... 455/7, 13.1, 9, 10, 436, 439; 370/331, 370/332, 329, 350
See application file for complete search history.

(56) References Cited

U.S. PATENT DOCUMENTS

| 6,215,782 | B1 * | 4/2001 | Buskens et al. ............... 370/350 |
| 6,839,329 | B1 * | 1/2005 | Sato et al. .................. 370/310.1 |
| 7,006,472 | B1 * | 2/2006 | Immonen et al. ............. 370/332 |
| 7,876,704 | B1 * | 1/2011 | Bims et al. .................... 370/254 |
| 8,228,861 | B1 * | 7/2012 | Nix ............................... 370/329 |
| 8,660,610 | B2 * | 2/2014 | Keevill et al. ................. 455/561 |
| 2004/0066764 | A1 * | 4/2004 | Koodli et al. ................. 370/331 |
| 2005/0188113 | A1 * | 8/2005 | Lee et al. ....................... 709/249 |
| 2008/0267171 | A1 * | 10/2008 | Buckley et al. ............... 370/352 |
| 2010/0054208 | A1 * | 3/2010 | Kojima .......................... 370/331 |
| 2010/0208706 | A1 * | 8/2010 | Hirano et al. ................. 370/332 |
| 2012/0099538 | A1 * | 4/2012 | Venkataswami et al. ..... 370/329 |
| 2012/0106507 | A1 * | 5/2012 | Venkataswami et al. ..... 370/331 |
| 2012/0188981 | A1 * | 7/2012 | Chang et al. .................. 370/331 |
| 2013/0294322 | A1 * | 11/2013 | Yun et al. ...................... 370/312 |
| 2014/0075523 | A1 * | 3/2014 | Tuomaala et al. ............... 726/6 |

* cited by examiner

*Primary Examiner* — Minh D Dao
(74) *Attorney, Agent, or Firm* — Rabin & Berdo, P.C.

(57) ABSTRACT

A signaling method for a terminal that performs direct communication between terminals terminal is disclosed. A transmitting terminal transmits a link establishment request message for establishing a link to a receiving terminal, and the receiving terminal transmits a link establishment response message responding to this message to the transmitting terminal. The link establishment request message includes a field indicating a flow to use if the receiving terminal acquires a token.

24 Claims, 17 Drawing Sheets

SIGNALLING METHOD FOR DIRECT COMMUNICATION BETWEEN TERMINALS

CROSS-REFERENCE TO RELATED APPLICATION

This application claims priority to and the benefit of Korean Patent Application Nos. 10-2012-0075228 and 10-2013-0080591 filed in the Korean Intellectual Property Office on Jul. 10, 2012 and Jul. 9, 2013, respectively, the entire contents of which are incorporated herein by reference.

BACKGROUND OF THE INVENTION (a) Field of the Invention

The present invention relates to a signaling method for direct communication between terminals.

(b) Description of the Related Art

Direct communication refers to signal transmission and reception between terminals without mediation with a base station or control therebetween. As demand for direct communication between terminals is on the rise, a direct communication method within or outside an infrastructure communication region is required.

Standards for direct communication between terminals include IEEE Std. 802.16.1a. The IEEE Std. 802.16.1a is a standard that allows for direct communication between terminals as resources dedicated for direct communication are allocated in time and frequency domains in a frame structure of infrastructure communication between a base station and a terminal, and signals are exchanged between terminals through allocated radio resources.

To provide different QoS for each traffic stream in a radio resource region, flows are established at a MAC layer, and a MAC PDU (packet data unit) is constructed for each flow. In talk-around direct communication (TDC) according to IEEE Std. 802.16.1a, flow IDs (FIDs) are established in a unidirectional link establishment process, and the transmitting side configures the FIDs to not overlap. However, if the direction of unidirectional traffic is changed by a token handover procedure, the traffic source may be changed to a terminal with no FID. In this case, the transmitting terminal is not able to construct a MAC PDU for the terminal with no FID.

A multicast connection involves transmitting data to a plurality of user groups. A connection setup procedure is performed in the step of setting up an initial multicast connection, by which a multicast connection group is created. However, the existing IEEE Std. 802.16.1a does not provide for an operation scenario for a user (terminal) who leaves the multicast connection group. Also, this standard does not define a procedure of transmitting multicast connection setup information after the setup step, and therefore additional users who want to participate in the multicast connection group may not be able to participate in the multicast connection group.

The IEEE Std. 802.16.1a does not define a procedure of detecting the presence or absence of a receiving terminal within a communication distance when making a unidirectional unicast and multicast connection, or releasing a connection that fails to connect to a communication channel.

SUMMARY OF THE INVENTION

The present invention has been made in an effort to provide a signaling method which establishes an FID in order to support a token handover procedure in a unidirectional link.

In addition, the present invention has been made in an effort to provide a signaling method which dynamically maintains a multicast connection group.

Moreover, the present invention has been made in an effort to provide a signaling method which detects the presence or absence of a receiving terminal within a communication distance and releases a call connection if the receiving terminal is outside the communication distance.

The present invention has been made in a further effort to provide a signaling method which runs multiple dedicated channels in a link.

An exemplary embodiment of the present invention provides a signaling method for a first terminal to perform direct communication between terminals. The signaling method includes: transmitting a first link establishment request message for establishing a direct communication link to a second terminal; and receiving a link establishment response message for establishing a direct communication link from the second terminal, wherein the first link establishment response message includes a first field indicating a flow that the second terminal will use.

The first link establishment request message may further include a second field indicating "Flow Establishment Request for Token Handover".

The first link establishment response message may further include a second field indicating "Flow Establishment Confirm for Token Handover".

The first link establishment request message may be transmitted through an RTS (request to send) data part, and the first link establishment response message may be transmitted through a CTS (clear to send) data part.

The signaling method may further include: detecting the loss of the direct communication link; and upon detecting the loss of the direct communication link, releasing the direct communication link.

The detecting may include detecting that the loss of the direct communication link has occurred, if no signal is received on a subchannel, which is one of channels established between the first terminal and the second terminal, a predetermined number of times or more.

The releasing may include transmitting a link release command message for releasing the direct communication link to the second terminal.

The signaling method may further include, if the direct communication link is run on multiple dedicated channels, releasing at least one of the multiple dedicated channels.

The releasing of at least one dedicated channel may include: receiving a report on the states of the multiple dedicated channels from the second terminal, and selecting one to release from the multiple channels; and transmitting a resource change command message including a field for identifying the resources of the dedicated channel to release to the second terminal.

Another exemplary embodiment of the present invention provides a signaling method for a first terminal that performs direct communication between terminals. The signaling method may include: transmitting a token advertisement message for announcing a token to a plurality of second terminals; receiving a token request message from a third terminal wanting to have a token, among the plurality of second terminals; and transmitting a token response message responding to the token request message, wherein the token request message may include a first field indicating a flow that the third terminal will use.

The flow may be used when the third terminal makes a multicast connection.

The signaling method may further include transmitting a token handover message informing about a token handover to the plurality of second terminals.

Yet another exemplary embodiment of the present invention provides a signaling method for a first terminal to perform direct communication between terminals. The signaling method may include: transmitting a MAC header to the plurality of second terminals; transmitting a preamble to the plurality of second terminals; and repeatedly transmitting a link establishment command message for establishing a direct communication link to the plurality of second terminals through an RTS (request to send) data part.

The signaling method may further include: detecting the loss of the direct communication link; and upon detecting the loss of the direct communication link, releasing the direct communication link.

The detecting may include detecting that the loss of the direct communication link has occurred, if a signal transmitted on a subchannel, which is one of the channels established between the first terminal and the plurality of second terminals, has a lower value than a clear channel threshold.

A further exemplary embodiment of the present invention provides a signaling method for a relay terminal that relays direct communication between a first terminal and a second terminal. The signaling method may include: receiving a relay request message requesting relay information from the first terminal; and transmitting a relay response message responding to the relay request message to the first terminal, wherein the relay response message may include a field indicating a flow that the second terminal will use.

The signaling method may further include: transmitting the relay request message to the second terminal; and receiving the relay response message including the field from the second terminal.

The relay request message may include a field indicating "Flow Establishment Request for Token Handover", and the relay response message may further include a field indicating "Flow Establishment Confirm for Token Handover".

A further exemplary embodiment of the present invention provides a signaling method for a relay terminal that relays direct communication between a first terminal and a plurality of second terminals. The signaling method may include: receiving a token handover message for handing over a token from the first terminal; transmitting a token advertisement message for announcing a token to the plurality of second terminals; receiving a token request message from a third terminal wanting to have a token from the plurality of second terminals; and transmitting a token response message responding to the token request message to the third terminal, wherein the token request message may include a field indicating a flow that the third terminal will use.

The signaling method may further include transmitting a link establishment command message including the flow to the plurality of second terminals and the third terminal.

According to an exemplary embodiment of the present invention, a terminal having acquired a token can successfully generate a packet by establishing an additional FID in order to support a token handover procedure in a unidirectional link.

According to another exemplary embodiment of the present invention, it is possible to cope with dynamic changes in multicast by repeatedly setting up a multicast connection.

According to yet another exemplary embodiment of the present invention, a procedure for detecting the loss of a direct communication link and releasing the direct communication link can be provided.

According to a further exemplary embodiment of the present invention, a procedure for releasing a dedicated channel depending on the channel states if multiple dedicated channels are run for a direct communication link is provided.

DETAILED DESCRIPTION OF THE EMBODIMENTS

Figure 1:
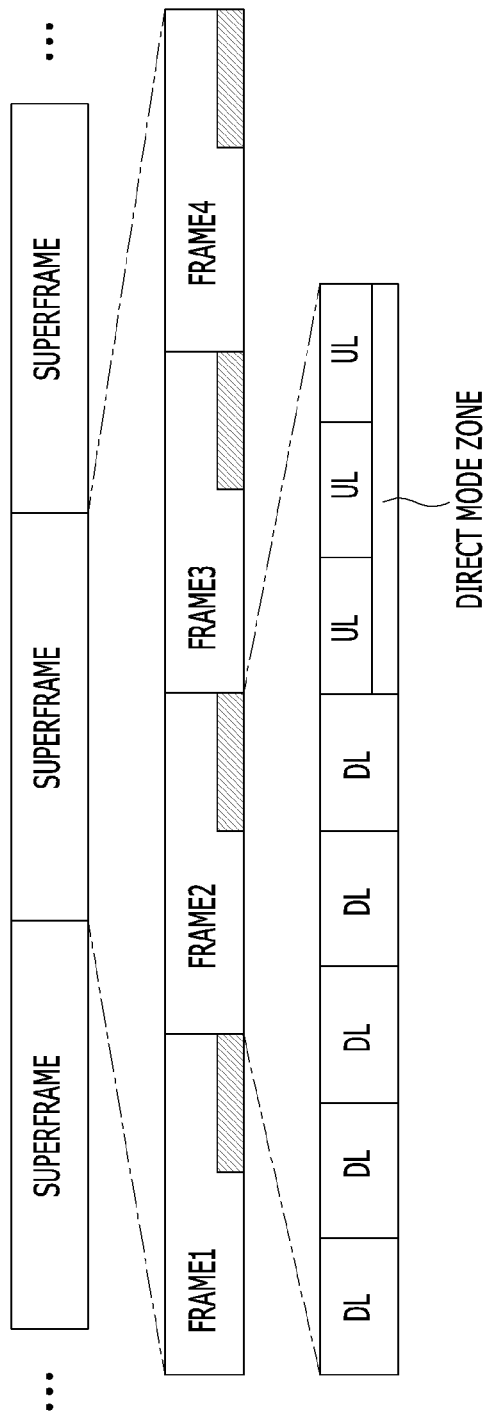
FIG. 1 and FIG. 2 are views of a frame structure showing resources for direct communication according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a mobile station (MS) may designate a terminal, a mobile terminal (MT), a mobile station (MS), an advanced mobile station (AMS), a high reliability mobile station (HR-MS), a subscriber station (SS), a portable subscriber station (PSS), an access terminal (AT), user equipment (UE), etc., and may include the entire or partial functions of the terminal, the MT, the MS, the AMS, the HR-MS, the SS, the PSS, the AT, the UE, etc.

A base station (BS) may designate an advanced base station (ABS), a high reliability base station (HR-BS), a nodeB, an evolved nodeB (eNodeB), an access point (AP), a radio access station (RAS), a base transceiver station (BTS), a mobile multihop relay (MMR)-BS, a relay station (RS) functioning as a base station, a high reliability relation station (HR-RS) functioning as a base station, etc., and may include the entire or partial functions of the ABS, the nodeB, the eNodeB, the AP, the RAS, the BTS, the MMR-BS, the RS, the HR-RS, etc.

Also, signaling for direct communication is a procedure for exchanging a MAC (medium access control) control message for direct communication, which may be used in combination with a signaling procedure or a MAC signaling procedure.

First of all, a frame structure for supporting a signaling method for direct communication according to an exemplary embodiment of the present invention will be described.

Figure 2:
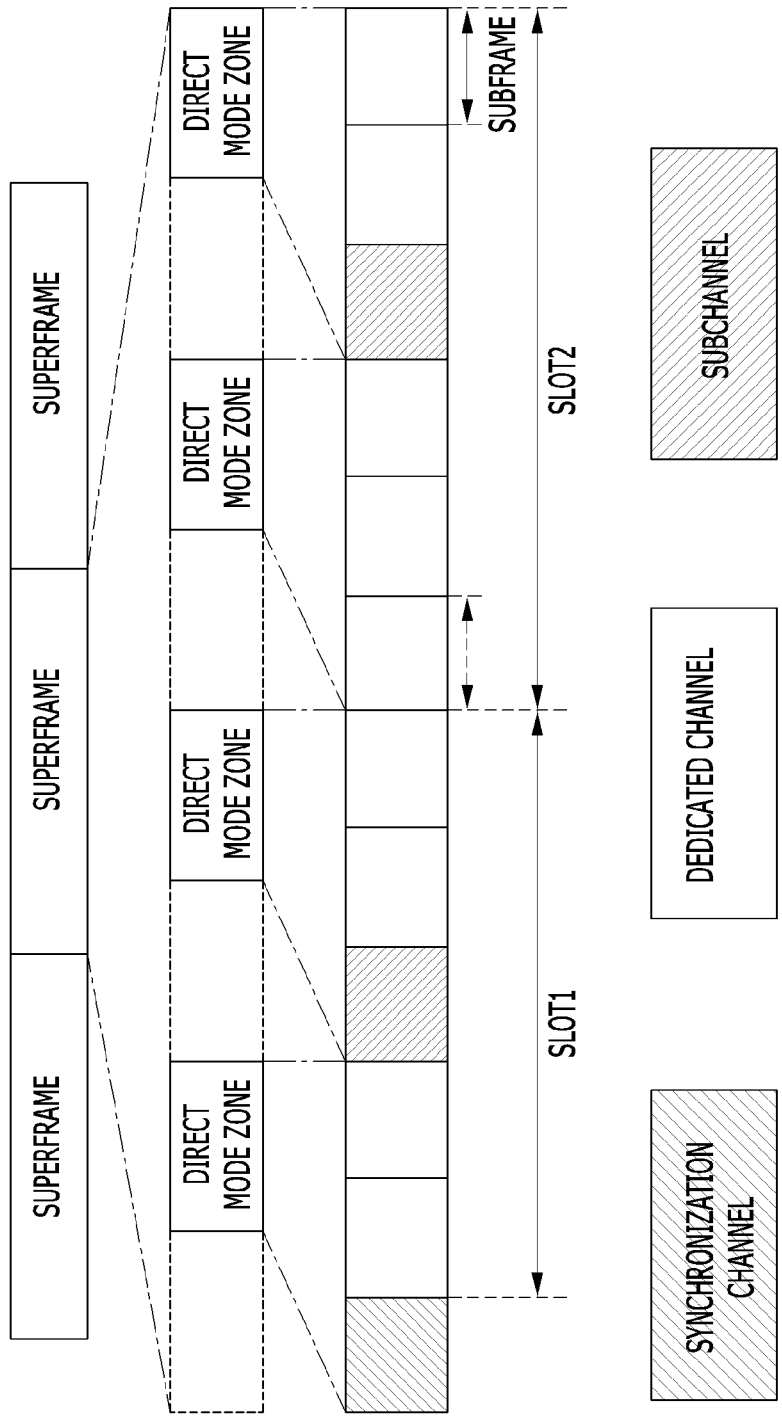

FIG. 1 and FIG. 2 are views of a frame structure showing resources for direct communication according to an exemplary embodiment of the present invention.

Referring to FIG. 1 and FIG. 2, a superframe includes a plurality of frames, and each frame includes a plurality of subframes. Some subframes in each frame may be allocated to an uplink (UL) resource region, and the other subframes may be allocated to a downlink (DL) resource region.

In this specification, a portion of the uplink resource region is illustrated as a radio resource (direct mode zone) for direct communication, but the present invention is not limited thereto. A radio resource for direct communication may not be used in infrastructure communication between a base station and a terminal. Terminals participating in direct communication may perform direct communication by using a direct communication protocol and procedure through a radio resource for direct communication.

Meanwhile, a radio resource for direct communication may include a synchronization channel, a dedicated channel, and a supplementary channel. The synchronization channel may transfer a synchronization message including information for obtaining frequency or time synchronization between a transmission terminal and a reception terminal that want to perform direct communication therebetween. The dedicated channel may transfer a packet for direct communication between terminals. Here, the packet may include data and control information. The supplementary channel may transfer RTS (request to send) and CTS (clear to send) for reserving a dedicated channel, an ACK message indicating whether or not a packet has been successfully transferred, a control message with respect to a channel measurement value, a MAC control message for signaling, and the like. Radio resources for direct communication within a single superframe may be divided into a synchronization part and a data part. Here, the data part may include two slots, and the slots may be indicated as slot 1 and slot 2. Each slot may include a dedicated channel and a supplementary channel. Here, the dedicated channel and the supplementary channel are in a 1:1 relationship. For example, a supplementary channel of slot 1 may correspond to a dedicated channel of slot 2 of a previous superframe. A supplementary channel of slot 2 may correspond to a dedicated channel of slot 1 of the same superframe.

Hereinafter, a signaling method for establishing an FID (flow ID) to support a token handover procedure will be described. This signaling method will be explained with respect to unidirectional unicast connection, unidirectional multicast connection, unidirectional unicast connection and unicast relay connection, and unidirectional unicast connection and multicast relay connection, according to the configuration of a link.

First, a method for establishing an additional FID when making a unidirectional unicast connection will be described with reference to FIG. 3 and FIG. 4.

Figure 3:
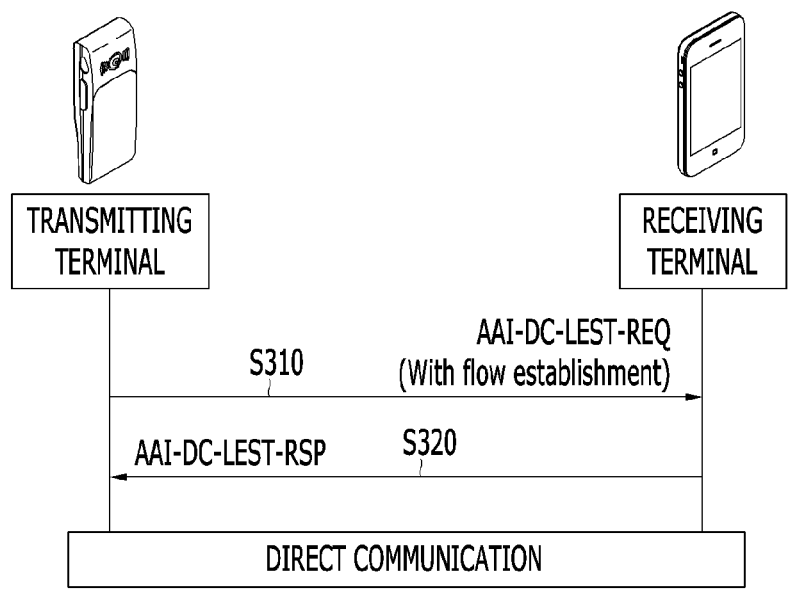
FIG. 3 is a view showing a link establishment procedure when making a unidirectional unicast connection.

FIG. 3 is a view showing a link establishment procedure when making a unidirectional unicast connection.

Referring to FIG. 3, a transmitting terminal transmits an advanced air interface-direct communication-link establishment-request (AAI-DC-LEST-REQ) message for establishing a direct communication link to a receiving terminal (S310). A flow assigned by the transmitting terminal is established in the AAI-DC-LEST-REQ message.

The receiving terminal negotiates about whether to use the function of supporting a token handover procedure or not, through the AAI-DC-LEST-REQ message. As shown in the underlined parts of the following Table 1, the transmitting terminal adds a "Flow Establishment Request for Token Handover" field to the AAI-DC-LEST-REQ message and transmits the message to the receiving terminal. If this field value is set to "Not Allowed", the token handover procedure is not supported, whereas if this field value is set to "Request to establish flow for token handover", the token handover procedure is supported.

Afterwards, the receiving terminal transmits an advanced air interface direct communication-link establishment-response (AAI-DC-LEST-RSP) message to the transmitting terminal (S320). In this case, as shown in the underlined parts of the following Table 2, the receiving terminal adds a "Flow Establishment Confirm for Token Handover" field to the AAI-DC-LEST-RSP message and transmits the message to the transmitting terminal. If this field value is set to "Not Allowed", the token handover procedure is not supported, whereas, if this field value is set to "Confirm flow establishment for token handover", the token handover procedure is supported. If the "Flow Establishment Request for Token Handover" field of the AAI-DC-LEST-REQ message transmitted by the transmitting terminal is set to "Request to establish flow for token handover", and the "Confirm flow establishment for token handover" field of the AAI-DC-LEST-RSP message transmitted by the receiving terminal is set to "Flow Establishment Confirm for Token Handover", the token handover procedure is finally determined.

Meanwhile, the receiving terminal establishes a flow that the receiving terminal will use, through the AAI-DC-LEST-RSP message. As shown in the underlined parts of the following Table 2, a field for establishing an additional flow (to be used by the receiving terminal) is added to the AAI-DC-LEST-RSP message transmitted by the receiving terminal. The additional flow is used to process traffic that the receiving terminal transmits later after acquiring a token.

Figure 4:
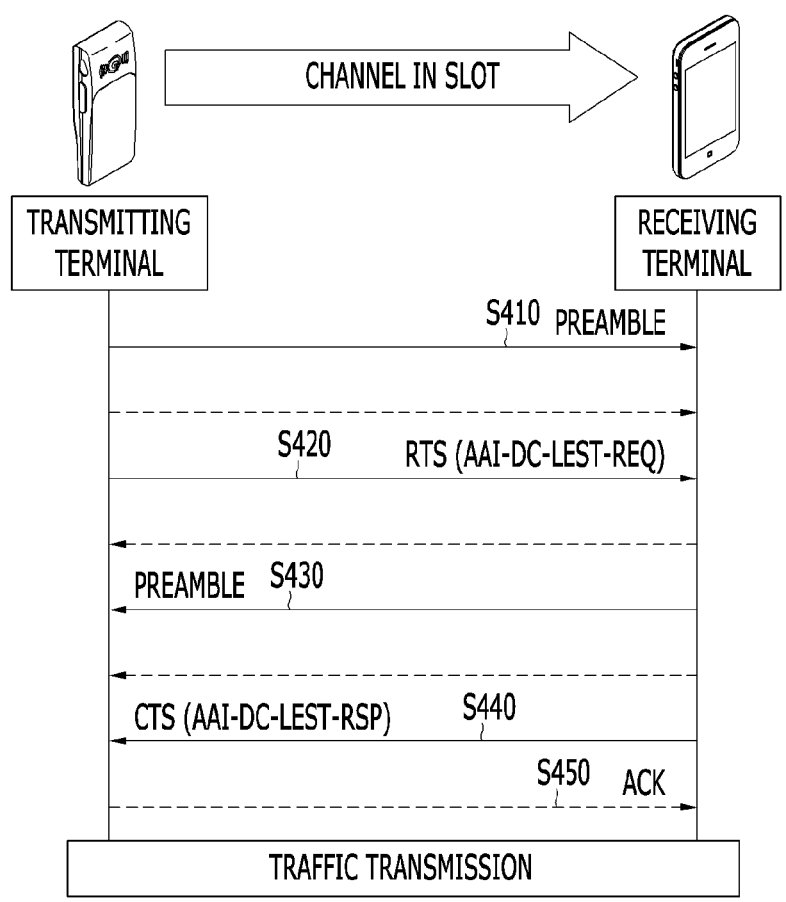
FIG. 4 is a view showing a link establishment procedure when making a unidirectional unicast connection according to another exemplary embodiment of the present invention.

FIG. 4 is a view showing a link establishment procedure when making a unidirectional unicast connection according to another exemplary embodiment of the present invention.

Referring to FIG. 4, a resource allocation function and a link establishment function are managed in an integrated way.

The transmitting terminal transmits a preamble to the receiving terminal (S410), and then transmits RTS and transmits an AAI-DC-LEST-REQ message through an RTS data part (S420).

Thereafter, the receiving terminal transmits a preamble (S430), transmits CTS, and then transmits an AAI-DC-LEST-RSP message through a CTS data part (S440).

Here, the AAI-DC-LEST-REQ message includes the "Flow Establishment Request for Token Handover" field, as explained in FIG. 3, and the AAI-DC-LEST-RSP message includes the "Flow Establishment Confirm for Token Handover" field.

Table 1 below describes the fields in the AAI-DC-LEST-REQ message, and Table 2 describes the fields in the AAI-DC-LEST-RSP message.

TABLE 1

| Field | Size (bits) | Value/Description | Condition |
|---|---|---|---|
| Link Change Count | 4 | The change count of this transaction assigned by the sender. If new transaction is started, Link Change Count is incremented by one (modulo 16) by the sender. | Shall always be present |
| Flow Establishment Request for Token Handover | 4 | Indicates that the sending HR-MS requests the receiving HR-MS to establish flows and send MAC PDUs on the flows<br>0x0: Request to establish flow for token handover<br>0x1: Not allowed<br>0x2 to 0xF: Reserved. | Shall always be present |
| For (i=0; i<N_Flow_Est; i++) { | | N_Flow_Est is the number of flows on which the sender of this message sends MAC PDUs.<br>Range [0 . . . 1] | |
| FID | 4 | Flow identifier assigned by the sink of packets on the flow | |
| Traffic Priority | 3 | 0 to 7: Higher numbers indicate higher priority<br>Default: 0 | |
| CS Specification Parameters | 8 | 0-15: Reserved<br>16: Voice Codec G.729A<br>17: Voice Codec AMR<br>18-255: Reserved | |
| MAC Header Type | 1 | Indicates whether AGMH or SPMH is presented at the start of MAC PDUs of the service flow.<br>0: AGMH (Advanced Generic MAC Header)<br>1: SPMH (Short-Packet MAC header)<br>default value is 0. | |
| } | | | |

TABLE 2

| Field | Size (bits) | Value/Description | Condition |
|---|---|---|---|
| Link Change Count | 4 | Link Change Count from corresponding the AAI-AAI-DC-LEST-REQ | Shall always be present |
| Confirmation Code | 4 | Zero indicates the request was successful. Nonzero indicates failure.<br>0x0: accept<br>0x1: reject with a recommended DCH<br>0x2: reject<br>0x3 to 0xF: reserved | Shall always be present |
| Flow Establishment Confirm for Token Handover | 1 | Zero indicates that the sending HR-MS of this message confirms flow establishment.<br>0: Confirm flow establishment for token handover<br>1: Not allowed | Shall always be present |

TABLE 2-continued

| Field | Size (bits) | Value/Description | Condition |
|---|---|---|---|
| Direct Mode Zone Type | 2 | Direct mode zone type of a recommended DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3 to 0xF: Reserved. | Present if Confirmation Code == 0x1 |
| DCH Number | 6 | Recommended DCH number on the zone of Direct Mode Zone Type | Present if Confirmation Code == 0x1 |
| For (i=0; i<N_Flow_Est; i++) { | | N_Flow_Est is the number of flows on which the sender of this message sends MAC PDUs.<br>Range [0 . . . 1] | Present if Confirmation Code == 0x0 and Flow Establishment Confirm for Token Handover == 0x0 |
| FID | 4 | Flow identifier assigned by the source of packets on the flow | Present if Confirmation Code == 0x0 and Flow Establishment Confirm for Token Handover == 0x0 |
| Traffic Priority | 3 | 0 to 7: Higher numbers indicate higher priority<br>Default: 0 | Present if Confirmation Code == 0x0 and Flow Establishment Confirm for Token Handover == 0x0 |
| CS Specification Parameters | 8 | 0-15: Reserved<br>16: Voice Codec G.729A<br>17: Voice Codec AMR<br>18-255: Reserved | Present if Confirmation Code == 0x0 and Flow Establishment Confirm for Token Handover == 0x0 |
| MAC Header Type | 1 | Indicates whether AGMH or SPMH is presented at the start of MAC PDUs of the service flow.<br>0: AGMH (Advanced Generic MAC Header)<br>1: SPMH (Short-Packet MAC header)<br>default value is 0. | Present if Confirmation Code == 0x0 and Flow Establishment Confirm for Token Handover == 0x0 |
| } | | | |

Next, a method for establishing an additional FID when making a unicast multicast connection will be described with reference to FIG. 5 and FIG. 6.

Figure 5:
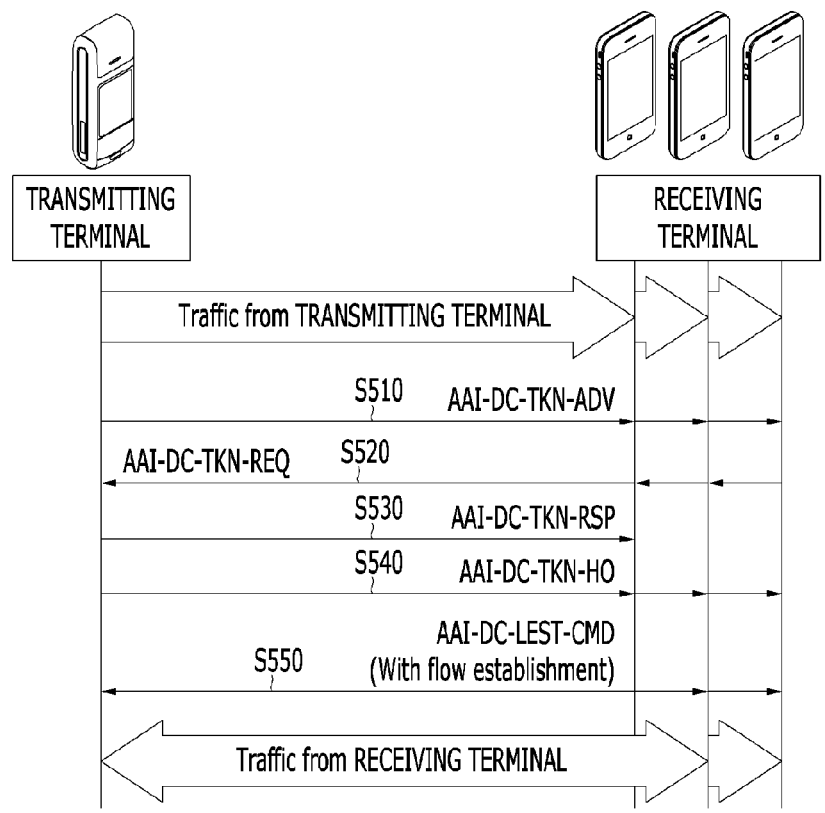
FIG. 5 is a view showing a token handover procedure when making a unicast multicast connection according to an exemplary embodiment of the present invention.

FIG. 5 is a view showing a token handover procedure when making a unicast multicast connection according to an exemplary embodiment of the present invention.

The token handover procedure is a procedure for changing the direction of data transmission and reception while using an allocated radio resource as it is for unidirectional direct communication connection. A token refers to the authority to transmit a signal through the radio resource. A terminal having a token is eligible to transmit a signal. The token can be owned by a single terminal, and the remaining terminals receive a signal through a radio resource.

Referring to FIG. 5, a transmitting terminal having a token announces token information to a plurality of receiving terminals through an advanced air interface-direct communication-token-advertisement (AAI-DC-TKN-ADV) message for announcing a token (S510), thus informing that the token is available.

A terminal wanting to have a token, among the plurality of receiving terminals, transmits an advanced air interface-direct communication-token-request (AAI-DC-TKN-REQ) message requesting a token to the transmission terminal (S520), and receives an advanced air interface-direct communication-token-response (AAI-DC-TKN-RSP) message from the transmitting terminal (S530). Here, the receiving terminal may use a different slot from the slot in which the AAI-DC-TKN-ADV message is transmitted. That is, the procedure for requesting a token may be performed as a unidirectional one-to-one procedure through a slot other than the slot 1 set for unidirectional one-to-many connection. To this end, the receiving terminal may transmit an AAI-DC-TKN-REQ message through an RTS data part and receive an AAI-DC-TKN-RSP message through a CTS data part.

Then, the transmitting terminal selects a receiving terminal to which the token is to be transferred, and announces token information to the plurality of receiving terminals through an advanced air interface-direct communication-token-handover (AAI-DC-TKN-HO) message informing about the token handover (S540), by which the token handover procedure is completed.

lishing a flow that the receiving terminal wanting to acquire a token will add, and this added flow is used for the receiving terminal to process traffic after acquiring a token.

Table 3 below describes the fields in the AAI-DC-TKN-REQ message explained above, and the AAI-DC-TKN-RSP message includes fields indicating added flows, as shown in the underlined parts of Table 3.

TABLE 3

| Field | Size (bits) | Value/Description | Condition |
|---|---|---|---|
| Direct Mode Zone Type | 2 | Direct mode zone type of a recommended DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3 to 0xF: Reserved. | |
| DCH Number | 4 | Indicates a number of dedicated channels with DCH Number. | |
| For (i=0; i<N_Flow_Est;i++) { | | N_Flow_Est is the number of flows on which the sender of this message sends MAC PDUs.<br>Range [0 . . . 1] | |
| FID | 4 | Flow identifier assigned by the source of packets on the flow | |
| Traffic Priority | 3 | 0 to 7: Higher numbers indicate higher priority<br>Default: 0 | |
| CS Specification Parameters | 8 | 0-15: Reserved<br>16: Voice Codec G.729A<br>17: Voice Codec AMR<br>18-255: Reserved | |
| MAC Header Type | 1 | Indicates whether AGMH or SPMH is presented at the start of MAC PDUs of the service flow.<br>0: AGMH (Advanced Generic MAC Header)<br>1: SPMH (Short-Packet MAC header)<br>default value is 0. | |
| } | | | |

Afterwards, the terminal which has acquired the token (i.e., a terminal selected from among the plurality of receiving terminals) transmits an advanced air interface-direct communication-link establishment-command (AAI-DC-LEST-CMD) message to the plurality of receiving terminals through a dedicated channel, thereby performing the procedure of setting up a multicast connection. If this procedure is performed subsequent to a synchronization message, the terminal which has acquired the token transmits a Ded-CH preamble through the dedicated channel, and subsequently transmits the AAI-DC-LEST-CMD message to the plurality of receiving terminals. In this case, the AAI-DC-LEST-CMD message is an advertisement type, and transmitted together with an advanced air interface-direct communication-request to send (AAI-RTS) message (including DCGID) for performing channel occupancy. By this procedure of setting up a multicast connection, terminals having no multicast connection information (including terminals that have moved and have a new configuration) may participate in a multicast group. Meanwhile, a flow ID (FID) assigned by the terminal that has acquired the token is established in the AAI-DC-LEST-CMD message, and the terminal that has acquired the token makes a multicast connection to the receiving terminal by using the assigned FID.

Meanwhile, in the exemplary embodiment of the present invention, a receiving terminal wanting to acquire a token adds flow ID (FID) information to an AAI-DC-TKN-REQ message. That is, as shown in the underlined parts of Table 3, the AAI-DC-TKN-REQ message includes a field for estab- The receiving terminal that has acquired a new token (hereinafter referred to as "terminal having acquired a token") sets up a unidirectional multicast connection to a new receiving terminal, which will be described in FIG. 6.

Figure 6:
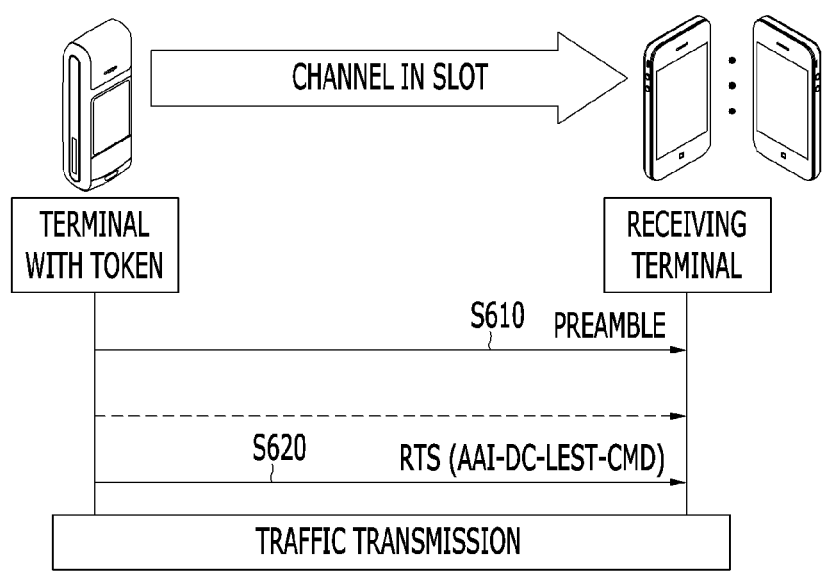
FIG. 6 is a view showing link establishment when a terminal having acquired a token makes a unidirectional multicast connection according to an exemplary embodiment of the present invention.

FIG. 6 is a view showing link establishment when a terminal having acquired a token makes a unidirectional multicast connection according to an exemplary embodiment of the present invention.

Referring to FIG. 6, the terminal having acquired the token transmits a preamble to a plurality of receiving terminals (S610), transmits RTS, and multicasts an advanced air interface-direct communication-link establishment-command (AAI-DC-LEST-CMD) message through an RTS data part (S620). In this case, the terminal having acquired the token includes the added FID of FIG. 5 in the AAI-DC-LEST-CMD message, and the plurality of receiving terminals, upon receiving this message, use the FID assigned by the terminal having acquired the token in making a multicast connection. That is, the terminal having acquired the token makes a unidirectional multicast connection by using the added FID, thereby allowing receiving terminals that have had no multicast connection information to participate in the multicast group.

By doing so, the terminal having acquired the token can complete a new resource allocation procedure and a new link establishment procedure between the receiving terminals.

Next, a method for establishing an additional FID when making a unidirectional unicast connection and a unicast relay connection will be described with reference to FIGS. 7 to 9.

Figure 7:
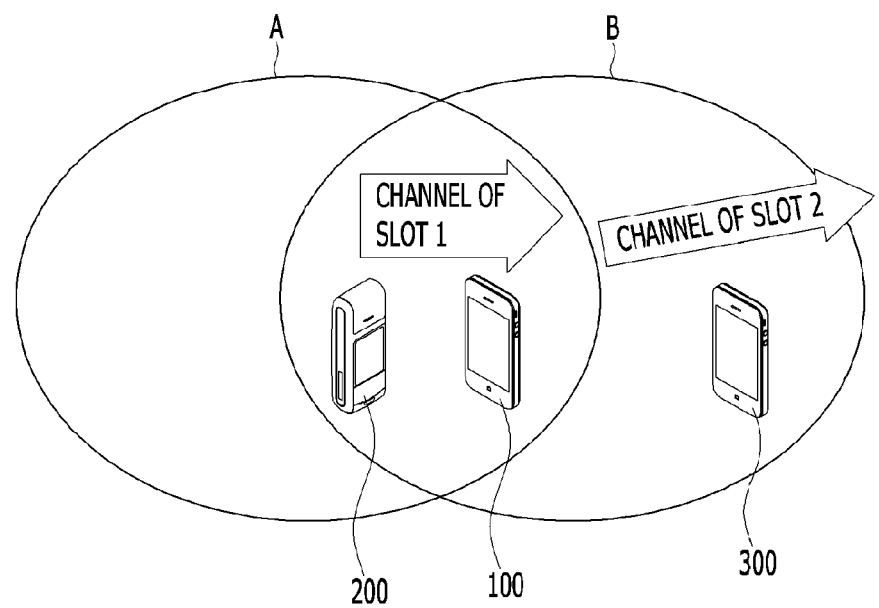
FIG. 7 is a view showing an environment in which a terminal relays a direct communication relay link.

FIG. 7 is a view showing an environment in which a terminal relays a direct communication relay link.

Referring to FIG. 7, a direct communication link (channel of slot 1) for a relay terminal 100 is established in relation to a transmitting terminal 200, and a direct communication link (channel of slot 2) for the relay terminal 100 is established in relation to a receiving terminal 300. The relay terminal 100 may be positioned in an area where both the coverage A of the transmitting terminal 200 and the coverage B of the receiving terminal B exist. The relay terminal 100 receives data transmitted by the transmitting terminal 200 through the direct communication link, and transmits the data to the receiving terminal through a different direct communication link.

Figure 8:
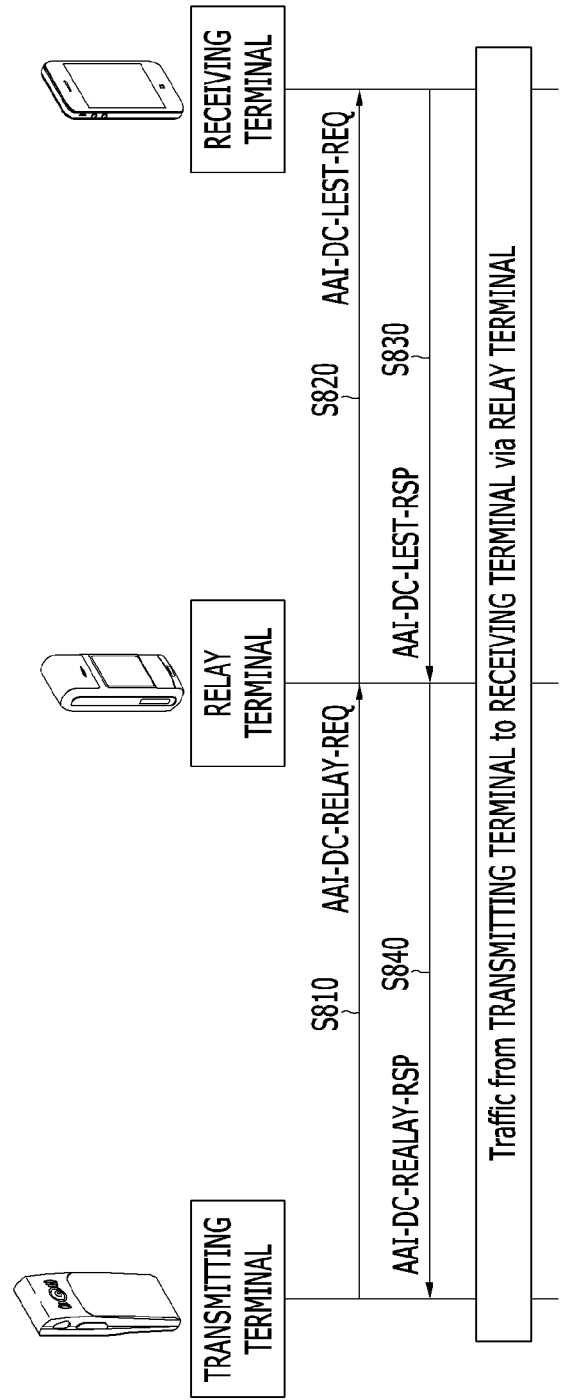
FIG. 8 is a view showing a procedure for acquiring relay information according to an exemplary embodiment of the present invention.

FIG. 8 is a view showing a procedure for acquiring relay information according to an exemplary embodiment of the present invention.

Referring to FIG. 8, a transmitting terminal transmits an advanced air interface-direct communication-relay-request (AAI-DC-RELAY-REQ) message requesting relay information to a relay terminal (S810), and the relay terminal transmits the AAI-DC-RELAY-REQ message to the receiving terminal (S820).

The receiving terminal transmits an advanced air interface-direct communication-relay-response (AAI-DC-RELAY-RSP) message to the relay terminal (S830), and the relay terminal transmits the AAI-DC-RELAY-RSP message to the transmitting terminal (S840).

By doing so, the relay information requesting and obtaining procedure is completed.

Figure 9:
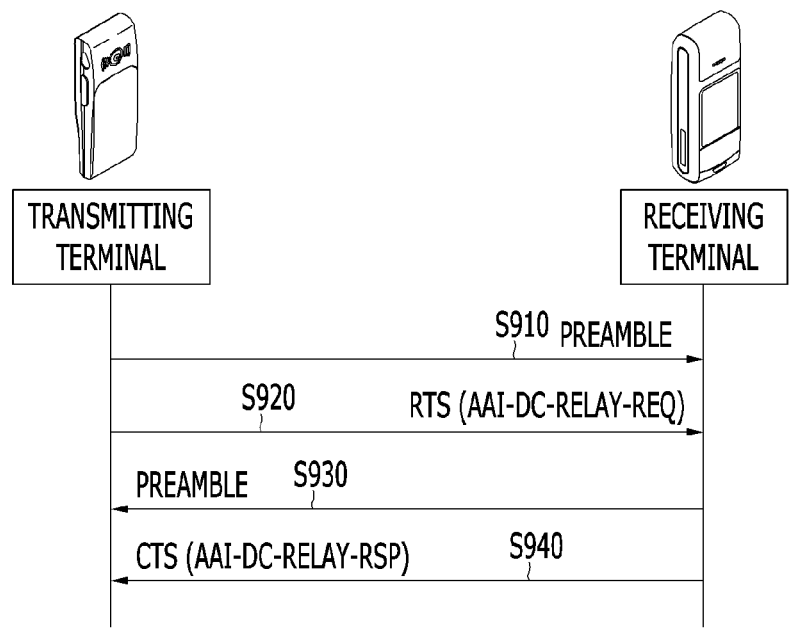
FIG. 9 is a view showing a procedure for obtaining relay information according to another exemplary embodiment of the present invention.

FIG. 9 is a view showing a procedure for obtaining relay information according to another exemplary embodiment of the present invention.

Referring to FIG. 9, a transmitting terminal transmits a preamble to a relay terminal (S910), and transmits an AAI-DC-RELAY-REQ message requesting relay information through RTS data (S920). Hereupon, the relay terminal transmits a preamble to the transmitting terminal that has transmitted the AAI-DC-RELAY-REQ message (S930), and transmits an AAI-DC-RELAY-RSP message through a CTS message (S940).

Meanwhile, in the exemplary embodiment of the present invention, the AAI-DC-RELAY-REQ message explained in FIGS. 8 and 9 includes the "Flow Establishment Request for Token Handover" field, as shown in the underlined parts of Table 4 below, and the AAI-DC-RELAY-RSP message includes the "Flow Establishment Confirm for Token Handover" field, as shown in the underlined parts of Table 5 below. A token handover function negotiation is conducted through these fields. The AAI-DC-RELAY-RSP message further includes a field indicating additional FID establishment for supporting token handover, as shown in the underlined parts of Table 5 below. That is, the receiving terminal or the relay terminal adds a field for establishing an additional flow (that the receiving terminal or the relay terminal will add) to the AAI-DC-RELAY-RSP message, whereby a flow used for the receiving terminal or the relay terminal to process traffic after acquiring a token is established.

Table 4 describes the fields in the AAI-DC-RELAY-REQ message, and Table 5 describes the fields in the AAI-DC-RELAY-RSP message.

TABLE 4

| Field | Size (bits) | Value/Description | Condition |
| --- | --- | --- | --- |
| Link Change Count | 4 | The change count of this transaction assigned by the sender. If new transaction is started, Link Change Count is incremented by one (modulo 16) by the sender. | Shall always be present |
| For (i=0; i<N_Flow_Est; i++) { | | N_Flow_Est is the number of flows on which the sender of this message sends MAC PDUs. Range [0 . . . 1] | |
| FID | 4 | Flow identifier assigned by the sink of packets on the flow | |
| Traffic Priority | 3 | 0 to 7: Higher numbers indicate higher priority Default: 0 | |
| CS Specification Parameters | 8 | 0-15: Reserved 16: Voice Codec G.729A 17: Voice Codec AMR 18-255: Reserved | |
| MAC Header Type | 1 | Indicates whether AGMH or SPMH is presented at the start of MAC PDUs of the service flow. 0: AGMH (Advanced Generic MAC Header) 1: SPMH (Short-Packet MAC header) default value is 0. | |
| } | | | |
| Target DCTID or DCGID | 24 | Indicates a receiving HR-MS (Group) address. | |
| Flow Establishment Request for Token Handover | 4 | Indicates that the sending HR-MS requests the receiving HR-MS to establish flows and send MAC PDUs on the flows 0x0: Request to establish flow for token handover 0x1: Not allowed 0x2 to 0xF: Reserved. | Present if Target DCTID exists |

TABLE 5

| Field | Size (bits) | Value/Description | Condition |
|---|---|---|---|
| Link Change Count | 4 | Link Change Count from the corresponding AAI-DCRELAY-REQ | Shall always be present |
| Confirmation Code | 4 | Zero indicates the request was successful. Nonzero indicates failure.<br>0x0: Accept<br>0x1: Reject with a recommended DCH<br>0x2: Await next response message<br>0x3 to 0xF: Reserved | Shall always be present |
| Direct Mode Zone Type | 2 | Direct mode zone type of a recommended DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3 to 0xF: Reserved. | Present if Confirmation Code == 0x1 |
| DCH Number | 6 | Recommended DCH number on zone of Direct Mode Zone Type | Present if Confirmation Code == 0x1 |
| Flow Establishment Confirm for Token Handover | 1 | Zero indicates that the sending HR-MS of this message confirms flow establishment.<br>0: Confirm flow establishment for token handover<br>1: Not allowed | Present if Confirmation Code == 0x0 and the sending HR-MS of this message receives the "Flow Establishment Confirm for Token Handover" field |
| For (i=0; i<N_Flow_Est; i++) { | | N_Flow_Est is the number of flows on which the sender of this message sends MAC PDUs.<br>Range [0 . . . 1] | Present if Confirmation Code == 0x0 and Flow Establishment Confirm for Token Handover == 0x0 |
| FID | 4 | Flow identifier assigned by the source of packets on the flow | Present if Confirmation Code == 0x0 and Flow Establishment Confirm for Token Handover == 0x0 |
| Traffic Priority | 3 | 0 to 7: Higher numbers indicate higher priority<br>Default: 0 | Present if Confirmation Code == 0x0 and Flow Establishment Confirm for Token Handover == 0x0 |
| CS Specification Parameters | 8 | 0-15: Reserved<br>16: Voice Codec G.729A<br>17: Voice Codec AMR<br>18-255: Reserved | Present if Confirmation Code == 0x0 and Flow Establishment Confirm for Token Handover == 0x0 |
| MAC Header Type | 1 | Indicates whether AGMH or SPMH is presented at the start of MAC PDUs of the service flow.<br>0: AGMH (Advanced Generic MAC Header)<br>1: SPMH (Short-Packet MAC header)<br>default value is 0. | Present if Confirmation Code == 0x0 and Flow Establishment Confirm for Token Handover == 0x0 |
| } | | | |

Next, a method for establishing an additional FID when making a unidirectional unicast connection and a multicast relay connection will be described with reference to FIGS. 10 to 12.

Figure 10:
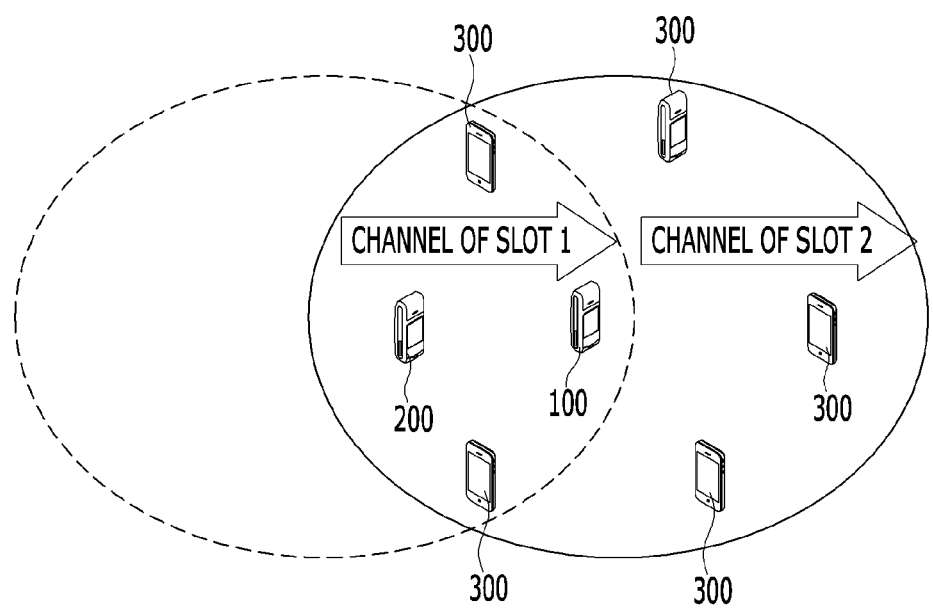
FIG. 10 is a view showing an environment in which a terminal makes a unidirectional unicast connection and a multicast relay connection.

FIG. 10 is a view showing an environment in which a terminal makes a unidirectional unicast connection and a multicast relay connection.

Referring to FIG. 10, when a transmitting terminal 200 transmits data to a relay terminal 100, the relay terminal 100 broadcasts or multicasts the data received from the transmitting terminal 200 to a plurality of receiving terminals 300. The present invention is not limited thereto, and a broadcasting or multicasting environment may be configured between the transmitting terminal and the relay terminal.

Figure 11:
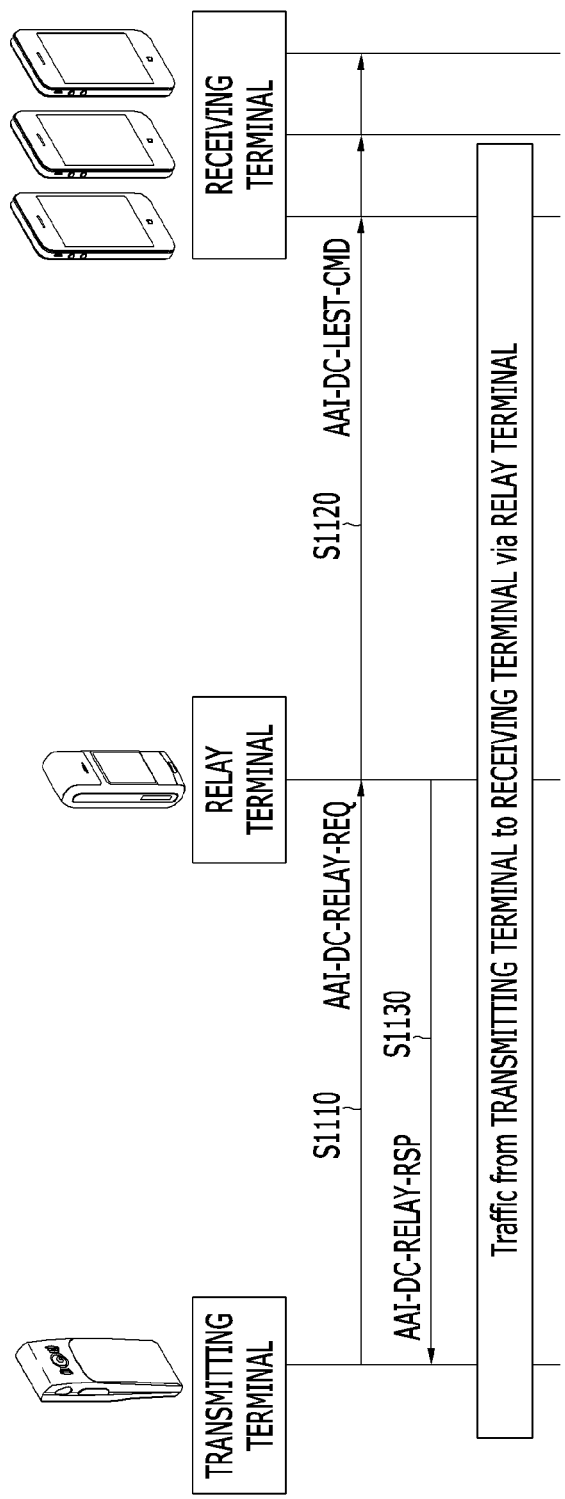
FIG. 11 is a view showing a procedure for setting up a unidirectional unicast connection and a multicast connection according to an exemplary embodiment of the present invention.

FIG. 11 is a view showing a procedure for setting up a unidirectional unicast connection and a multicast connection according to an exemplary embodiment of the present invention.

Referring to FIG. 11, a transmitting terminal transmits an AAI-DC-RELAY-REQ message to a relay terminal (S1110), and the relay terminal transmits an AAI-DC-LEST-CMD message to a plurality of receiving terminals (S1120). Then, the relay terminal transmits an AAI-DC-RELAY-RSP message to the transmitting terminal (S1130). By this procedure, a unidirectional unicast connection is set up between the transmitting terminal and the relay terminal, and a multicast connection is set up between the relay terminal and the plurality of receiving terminals.

Figure 12:
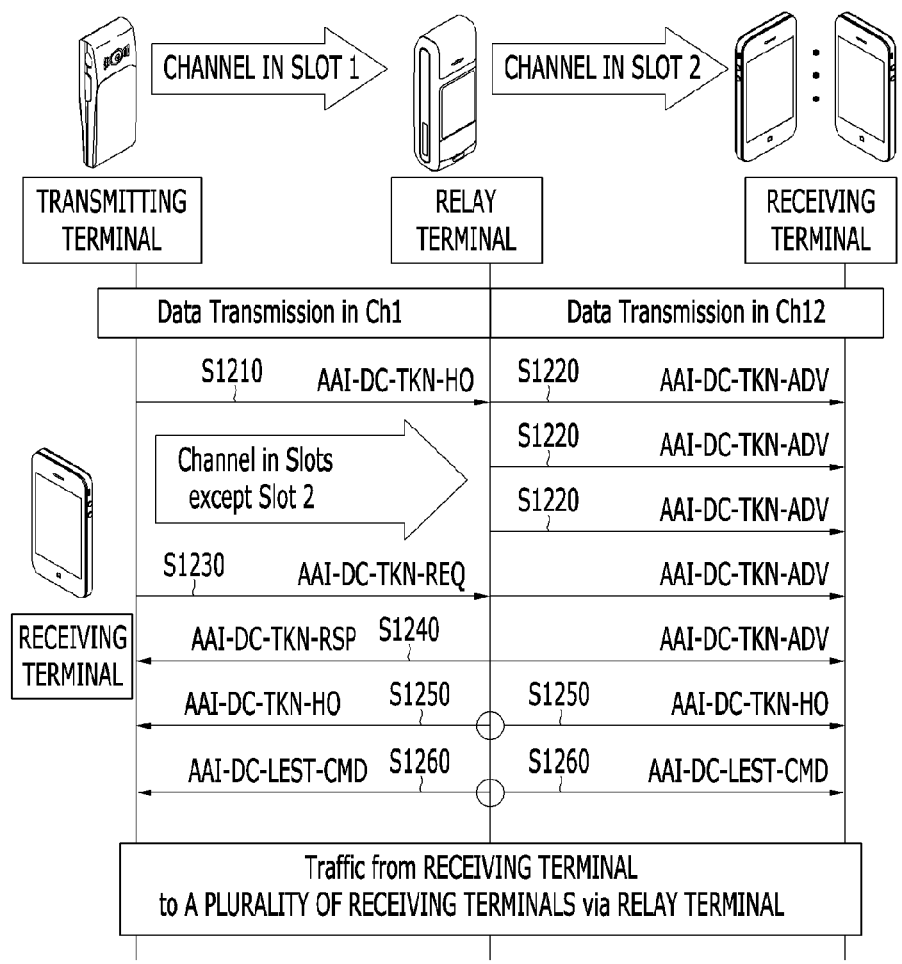
FIG. 12 is a view showing a procedure for managing a token by a relay terminal according to an exemplary embodiment of the present invention.

FIG. 12 is a view showing a procedure for managing a token by a relay terminal according to an exemplary embodiment of the present invention.

Referring to FIG. 12, when a transmitting terminal wants to return a token, the transmitting terminal transmits an AAI-DC-TKN-HO message informing about a token handover to a relay terminal (S1210). Then, the relay terminal continuously transmits an AAI-DC-TKN-ADV message announcing that the token is available to the plurality of receiving terminals (S1220). In this case, the slot between the transmitting terminal and the relay terminal and the slot between the relay terminal and the receiving terminals may be different.

Thereafter, a receiving terminal wanting to have a token exchanges AAI-DC-TKN-REQ/RSP messages with the relay terminal (S1230 and S1240). That is, a receiving terminal wanting to have a token transmits an AAI-DC-TKN-REQ message to the relay terminal (S1230), and receives an AAI-DC-TKN-RSP message responding to this message from the relay terminal (S1240). Meanwhile, upon receiving the AAI-DC-TKN-REQ message from the receiving terminal (wanting to have the token), when the relay terminal determines to hand over the token, the relay terminal transmits a AAI-DC-TKN-HO message informing about the token handover to the plurality of receiving terminals (S1250), thus completing the token management procedure. Thereafter, a terminal which has received the token transmits data to the relay terminal, and the relay terminal transmits the data to the other terminals. In this case, the relay terminal multicasts an AAI-DC-LEST-CMD message to set up a new multicast connection (S1260).

Meanwhile, in the exemplary embodiment of the present invention, a receiving terminal wanting to acquire a token adds flow ID (FID) information to an AAI-DC-TKN-REQ message. That is, the AAI-DC-TKN-REQ message includes a field for establishing a flow that the receiving terminal wanting to acquire a token will add, and this added flow is used for the receiving terminal to process traffic after acquiring a token. The AAI-DC-TKN-REQ message as above is identical to that of Table 3.

As seen from the above token change, whenever objects change in a multicast relay connection, the relay terminal sets up a multicast relay connection. In this procedure, a multicast connection is set up without changing relay terminals.

Figure 13:
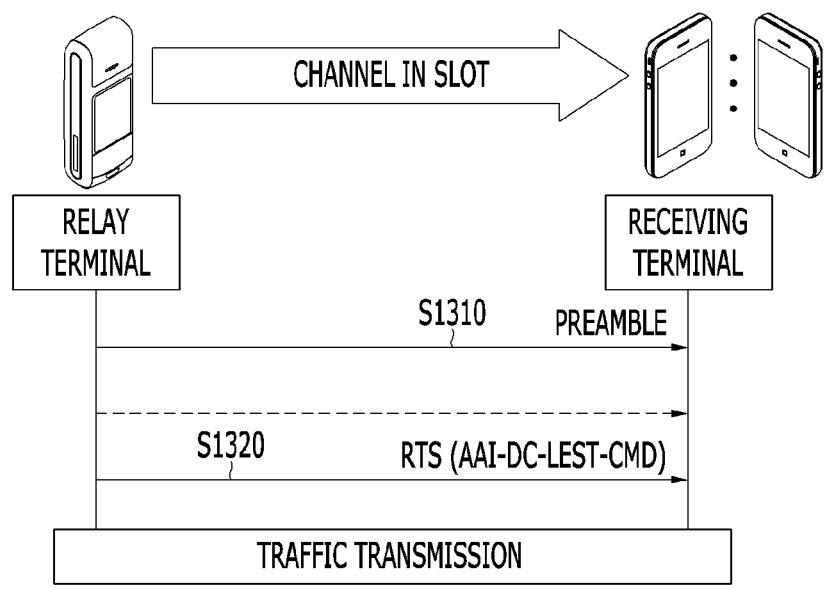
FIG. 13 is a view showing a link establishment procedure when a relay terminal makes a unidirectional multicast connection according to an exemplary embodiment of the present invention.

FIG. 13 is a view showing a link establishment procedure when a relay terminal makes a unidirectional multicast connection according to an exemplary embodiment of the present invention.

Referring to FIG. 13, a relay terminal transmits a preamble to a plurality of receiving terminals (S1310), transmits RTS, and multicasts an AAI-DC-LEST-CMD message through an RTS data part (S1320). In this case, the relay terminal includes the added FID of FIG. 12 in the AAI-DC-LEST-CMD message, and the plurality of receiving terminals, upon receiving this message, use the added FID in making a multicast connection. That is, the relay terminal makes a unidirectional multicast connection by using the added FID, thereby allowing receiving terminals that have had no multicast connection information to participate in the multicast group.

By doing so, the relay terminal can complete a new resource allocation procedure and a new link establishment procedure between the plurality of receiving terminals.

Next, a signaling method for dynamically maintaining a multicast connection group will be described. Although a communication group belonging to a multicast connection is dynamically variable, the dynamic characteristics of the communication group may not be supported because multicast connection information is transmitted only when setting up a multicast connection. To make up for it, in the exemplary embodiment of the present invention, the dynamic variability of a multicast communication group is supported by repeatedly performing a multicast connection procedure.

Figure 14:
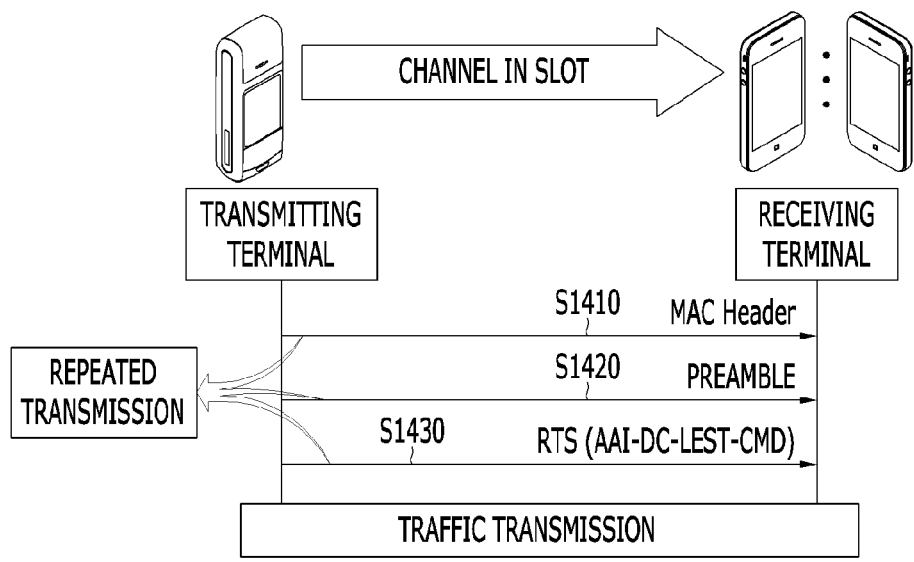
FIG. 14 is a view showing a link establishment procedure when making a unidirectional multicast connection to dynamically maintain a multicast connection group according to an exemplary embodiment of the present invention.

FIG. 14 is a view showing a link establishment procedure when making a unidirectional multicast connection to dynamically maintain a multicast connection group according to an exemplary embodiment of the present invention.

As shown in FIG. 14, a transmitting terminal transmits a MAC header (S1410), a preamble (S1420), and RTS to a plurality of receiving terminals, and multicasts an AAI-DC-LEST-CMD message through an RTS data part (S1430). A ranging notification is set in the MAC header.

Meanwhile, as shown in FIG. 14, a transmitting terminal according to an exemplary embodiment of the present invention repeatedly transmits three frames consisting of a MAC header, a preamble, and an AAI-DC-LEST-CMD message. That is, the transmitting terminal repeatedly transmits the AAI-DC-LEST-CMD message in order to dynamically maintain a multicast group, and the transmission cycle may be selected by the transmitting terminal.

Next, a signaling method for detecting the presence or absence of a receiving terminal within a communication distance and releasing a call connection if the receiving terminal is outside the communication distance will be described with reference to FIG. 15.

Figure 15:
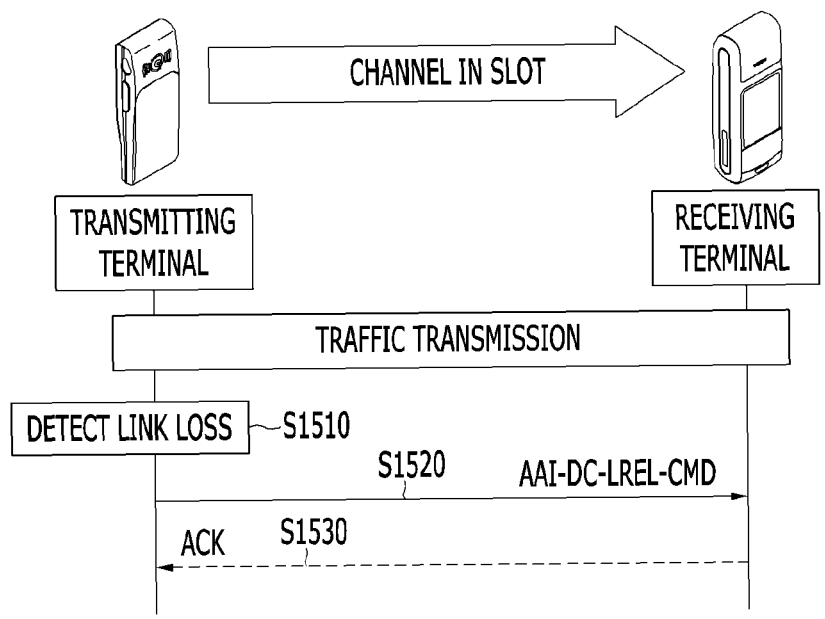
FIG. 15 is a view showing a method for detecting a link loss and releasing a link in a unidirectional unicast direct communication according to an exemplary embodiment of the present invention.

FIG. 15 is a view showing a method for detecting a link loss and releasing a link in a unidirectional unicast direct communication according to an exemplary embodiment of the present invention.

During the transmission of traffic between a transmitting terminal and a receiving terminal, if there is no signal transmitted on a subchannel in a unidirectional unicast connection, the transmitting terminal detects that a link loss has occurred (S1510). In this case, the transmitting terminal detects that a link loss has occurred if no response is made on the subchannel a predetermined number of times or more. If no response is made on the subchannel, this may indicate that an unallocated subchannel code has been received, or a subchannel signal has a lower value than a clear channel threshold.

Upon detecting a link loss, the transmitting terminal transmits an advanced air interface-direct communication-link release-command (AAI-DC-LREL-CMD) message to the receiving terminal (S1520). Then, the transmitting terminal receives acknowledgement (ACK) from the receiving terminal, and releases the link. The Link Release Command Code field in the AAI-DC-LREL-CMD message may be set to link loss (0x01).

If no signal response is made on the subchannel in a unidirectional multicast connection, as well as in the unidirectional unicast connection of FIG. 15, this can be deemed as a link loss. That is, if a signal going to the subchannel has a lower value than the clear channel threshold, this can be deemed as a link loss. Upon detecting a link loss as above, the transmitting terminal may transmit an AAI-DC-LREL-CMD message to the plurality of receiving terminals, and release the link without receiving acknowledgment. In this case, the Link Release Command Code field in the AAI-DC-LREL-CMD message may be set to link loss (0x01).

Finally, a signaling method for running multiple dedicated channels in a link will be described with reference to FIG. 16 and FIG. 17. That is, a procedure for deleting a dedicated channel to support the function of allocating multiple dedicated channels will be described.

Figure 16:
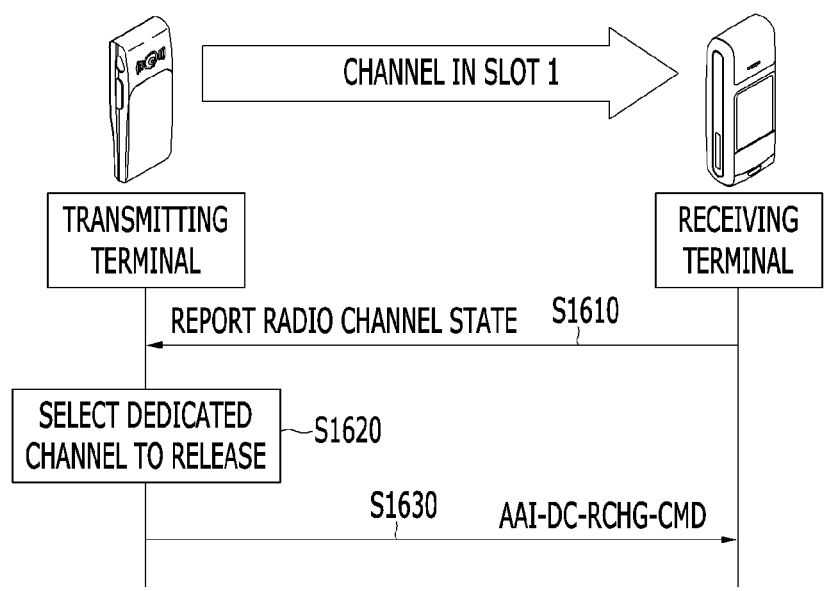
FIG. 16 is a view showing a method for releasing a dedicated resource channel in a unidirectional unicast direct communication according to an exemplary embodiment of the present invention.

FIG. 16 is a view showing a method for releasing a dedicated resource channel in a unidirectional unicast direct communication according to an exemplary embodiment of the present invention.

First of all, it is assumed that multiple dedicated channels are run for a unidirectional direction communication link between a transmitting terminal and a receiving terminal.

The transmitting terminal receives a report on the channel states transmitted from the receiving terminal (S1610), and selects a dedicated channel to release from the multiple dedicated channels (S1620). Upon selecting a dedicated channel to release from the multiple dedicated channels, the transmitting terminal transmits, to the receiving terminal, an advanced air interface-direct communication-resource change-command (AAI-DC-RCHG-CMD) message including a field for identifying the resources of the dedicated channel to release (S1630). As shown in the underlined parts of Table 6 below, the AAI-DC-RCHG-CMD message includes a field for identifying the resources of a dedicated channel to release.

Although FIG. 16 illustrates unidirectional unicast direct communication connection, the above-described method is also applicable to unidirectional multicast direct communication connection.

Table 6 below describes the fields in the AAI-DC-RCHG-CMD message.

TABLE 6

| Field | Size (bits) | Value/Description | Condition |
| --- | --- | --- | --- |
| For (i=0; i<N_DCH; i++) { | | N_DCH is the number of DCHs which are changed to new DCHs | |
| Old Direct Mode Zone Type | 2 | Direct mode zone type for old DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3: Reserved. | |
| Old DCH Number | 4 | Indicates old DCH number. | |
| New Direct Mode Zone Type | 2 | Direct mode zone type for new DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3: Reserved. | |
| New DCH Number } | 4 | Indicates new DCH number. | |
| For (i=0; i<N_DCH_Rel; i++) { | | N_DCH_Rel is the number of DCHs which are released from TDC communication | |
| Direct Mode Zone Type | 2 | Direct mode zone type for release<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3: Reserved. | |
| DCH Number } | 4 | Indicates DCH number for release | |

Figure 17:
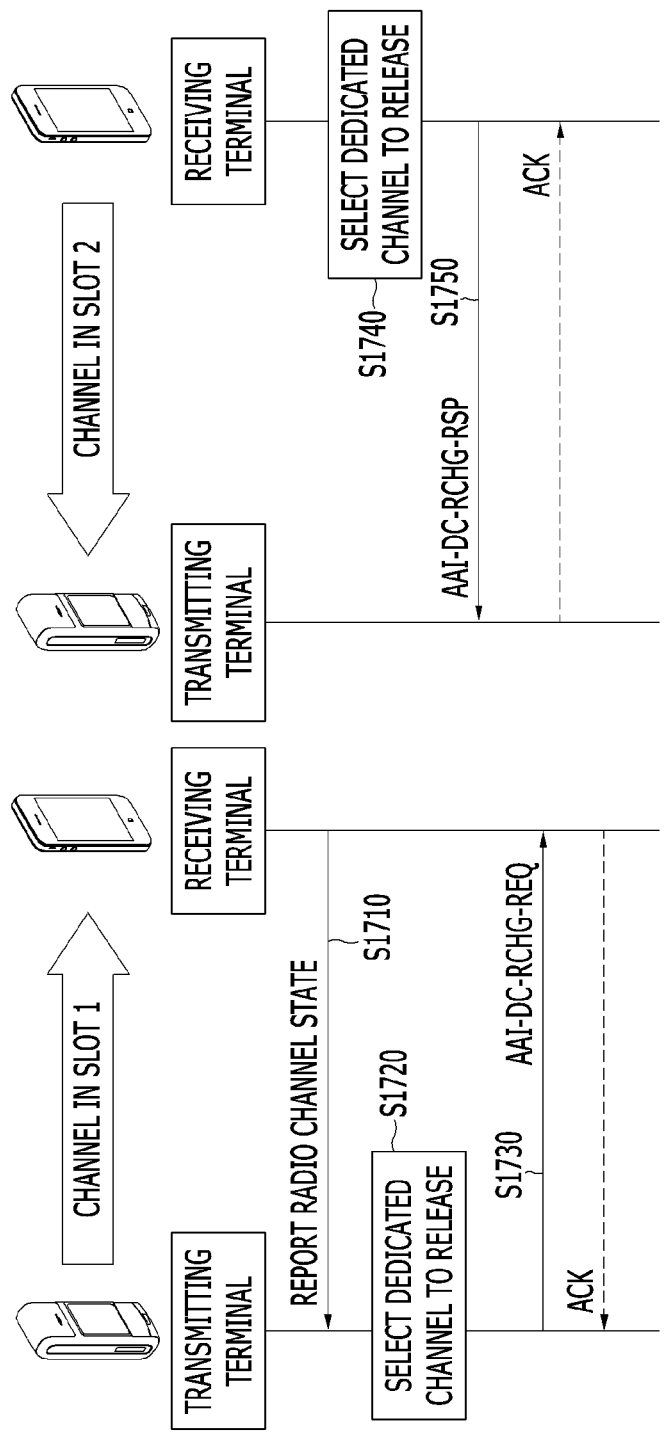
FIG. 17 is a view showing a method for releasing a dedicated channel in a bidirectional unicast direct communication link according to an exemplary embodiment of the present invention.

FIG. 17 is a view showing a method for releasing a dedicated channel in a bidirectional unicast direct communication link according to an exemplary embodiment of the present invention.

First of all, it is assumed that multiple dedicated channels are run for a bidirectional direct communication link between a transmitting terminal and a receiving terminal.

The transmitting terminal receives a report on the channel states transmitted from the receiving terminal (S1710), and selects a dedicated channel to release from the multiple dedicated channels (S1720). Upon selecting a dedicated channel to release from the multiple dedicated channels, the transmitting terminal transmits, to the receiving terminal through slot 1, an advanced air interface-direct communication-resource change-request (AAI-DC-RCHG-REQ) message including a field for identifying the resources of the dedicated channel to release (S1730). As shown in the underlined parts of Table 7 below, the AAI-DC-RCHG-REQ message includes the field for identifying the resources of the dedicated channel to release.

Table 7 describes the fields in the AAI-DC-RCHG-REQ message.

On the other hand, the receiving terminal, instead of the transmitting terminal, may select a dedicated channel to release, and may request the transmitting terminal to release the dedicated channel.

As shown in FIG. 17, the receiving terminal may measure the channel states, and then select a dedicated channel to release (S1740). Upon selecting a dedicated channel to release from the multiple dedicated channels, the receiving terminal transmits, to the transmitting terminal through slot 2,

TABLE 7

| Field | Size (bits) | Value/Description | Condition |
|---|---|---|---|
| For (i=0; i<N_DCH; i++) { | | N_DCH is the number of dedicated channels | |
| Old Direct Mode Zone Type | 2 | Direct mode zone type for old DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3 to 0xF: Reserved. | |
| Old DCH Number | 4 | Indicates old DCH number. | |
| New Direct Mode Zone Type | 2 | Direct mode zone type for new DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3: Reserved. | |
| New DCH Number<br>} | 4 | Indicates new DCH number. | |
| For (i=0; i<N_DCH_NI; i++) { | | N_DCH_NI is the number of recommended dedicated channels for candidates of new DCHs | Present if 0 < N_DCH_NI |
| Direct Mode Zone Type | 2 | Direct mode zone type of a recommended DCH<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3: Reserved. | |
| DCH Number | 6 | DCH number of a candidate | |
| Noise and Interference Level Mean | 8 | Noise and Interference mean. This is noise plus interference power level that is divided by the number of subcarriers in the frequency domain and averaged over the dedicated channel.<br>−134 dBm to −30 dBm in units of 1 dB.<br>−134 dBm is encoded as 0x00,<br>−30 dB is encoded as 0x69,<br>0x69 to 0xFF is reserved. | |
| Noise and Interference Level Variance<br>} | 4 | Noise and Interference variance.<br>0 dB to 15 dB in units of 1 dB. | |
| For (i=0; i<N_DCH_Rel; i++) { | | N_DCH_Rel is the number of DCHs which are released from TDC communication | |
| Direct Mode Zone Type | 2 | Direct mode zone type for release<br>0x0: Common direct mode zone (CAAI-DCZ)<br>0x1: Common direct mode zone extended (CAAI-DCZ-E)<br>0x2: Cell specific direct mode zone (CSAAI-DCZ)<br>0x3: Reserved. | |
| DCH Number<br>} | 4 | Indicates DCH number for release | | an advanced air interface-direct communication-resource change-request (AAI-DC-RCHG-RSP) message including a field for identifying the resources of the dedicated channel to release (S1750). As shown in the underlined parts of Table 8 below, the AAI-DC-RCHG-RSP message includes the field for identifying the resources of the dedicated channel to release.

Table 8 describes the fields in the AAI-DC-RCHG-RSP message.

TABLE 8

| Field | Size (bits) | Value/Description | Condition |
|---|---|---|---|
| Confirmation Code | 4 | Zero indicates the request was successful. Nonzero indicates failure. 0x0: accept with new mapping of DCHs 0x1: reject (continue to use current DCHs) 0x2 to 0xF: reserved | Shall always be present |
| For (i=0; i<N_DCH; i++) { | | N_DCH is the number of DCHs which are changed to new DCHs | Present if Confirmation Code == 0x0 |
| Old Direct Mode Zone Type | 2 | Direct mode zone type for old DCH 0x0: Common direct mode zone (CAAI-DCZ) 0x1: Common direct mode zone extended (CAAI-DCZ-E) 0x2: Cell specific direct mode zone (CSAAI-DCZ) 0x3: Reserved. | |
| Old DCH Number | 4 | Indicates old DCH number. | |
| New Direct Mode Zone Type | 2 | Direct mode zone type for new DCH 0x0: Common direct mode zone (CAAI-DCZ) 0x1: Common direct mode zone extended (CAAI-DCZ-E) 0x2: Cell specific direct mode zone (CSAAI-DCZ) 0x3: Reserved. | |
| New DCH Number } | 4 | Indicates new DCH number. | |
| For (i=0; i<N_DCH_Rel; i++) { | | N_DCH_Rel is the number of DCHs which are released from TDC communication | |
| Direct Mode Zone Type | 2 | Direct mode zone type for release 0x0: Common direct mode zone (CAAI-DCZ) 0x1: Common direct mode zone extended (CAAI-DCZ-E) 0x2: Cell specific direct mode zone (CSAAI-DCZ) 0x3: Reserved. | |
| DCH Number } | 4 | Indicates DCH number for release | |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A signaling method for a first terminal to perform direct communication with a second terminal, the signaling method comprising:
    transmitting a first link establishment request message for establishing a direct communication link to the second terminal;
    generating, by the second terminal, a first link establishment response message that includes a first field indicating a flow for use; and
    receiving the first link establishment response message for establishing a direct communication link from the second terminal.

2. The signaling method of claim 1, wherein the first link establishment request message further comprises a second field indicating "Flow Establishment Request for Token Handover".

3. The signaling method of claim 2, wherein the first link establishment response message further comprises a third field indicating "Flow Establishment Confirm for Token Handover".

4. The signaling method of claim 1, wherein the first link establishment request message is transmitted through an RTS (request to send) data part, and the first link establishment response message is transmitted through a CTS (clear to send) data part.

5. The signaling method of claim 1, further comprising:
    detecting the loss of the direct communication link; and
    upon detecting the loss of the direct communication link, releasing the direct communication link.

6. The signaling method of claim 5, wherein the detecting comprises detecting that the loss of the direct communication link has occurred, if no signal is received on a subchannel, which is one of channels established between the first terminal and the second terminal, a predetermined number of times or more.

7. The signaling method of claim 5, wherein the releasing comprises transmitting a link release command message for releasing the direct communication link to the second terminal.

8. The signaling method of claim 1, further comprising:
establishing the direct communication link between the first and second terminals; running the direct communication link on multiple dedicated channels; and
releasing at least one of the multiple dedicated channels.

9. The signaling method of claim 1, further comprising:
using the first field indicating a flow included in the first link establishment response message to support a token handover procedure in a unidirectional connection between the first terminal and the second terminal.

10. The signaling method of claim 9, further comprising:
if a direction of the unidirectional connection is changed by the token handover procedure, establishing a flow by using the first field included in the first link establishment response message.

11. A signaling method for a first terminal to perform direct communication between terminals, the signaling method comprising:
transmitting a first link establishment request message for establishing a direct communication link to a second terminal;
receiving a first link establishment response message for establishing a direct communication link from the second terminal, the first link establishment response message comprising a first field indicating a flow that the second terminal will use;
running the direct communication link on multiple dedicated channels; and
releasing at least one of the multiple dedicated channels, wherein the releasing of at least one dedicated channel comprises:
receiving a report on the states of the multiple dedicated channels from the second terminal, and selecting one to release from the multiple channels; and
transmitting a resource change command message including a field for identifying the resources of the dedicated channel to release to the second terminal.

12. A signaling method for a first terminal that performs direct communication with a plurality of second terminals, the signaling method comprising:
transmitting a token advertisement message for announcing a token to the plurality of second terminals;
generating a token request message that includes a first field indicating a flow for use of a third terminal;
receiving said token request message from said third terminal wanting to have a token, among the plurality of second terminals; and
transmitting a token response message responding to the token request message.

13. The signaling method of claim 12, further comprising:
making a multicast connection between the third terminal and the second terminals by using the flow which is indicated by the first field.

14. The signaling method of claim 12, further comprising:
transmitting a token handover message informing about a token handover to the plurality of second terminals.

15. The signaling method of claim 12, further comprising:
making a unidirectional multicast connection by using the first field by the third terminal which has acquired the token.

16. A signaling method for a first terminal to perform direct communication with a plurality of second terminals, the signaling method comprising:
transmitting a MAC header to the plurality of second terminals;
transmitting a preamble to the plurality of second terminals;
repeatedly transmitting a link establishment command message for establishing a direct communication link to the plurality of second terminals through an RTS (request to send) data part; and
generating, by the second terminals, a response message to be sent from the plurality of second terminals, said response message including a first field indicating a flow for use.

17. The signaling method of claim 16, further comprising:
detecting the loss of the direct communication link; and
upon detecting the loss of the direct communication link, releasing the direct communication link.

18. The signaling method of claim 17, wherein the detecting comprises detecting that the loss of the direct communication link has occurred, if a signal transmitted on a subchannel, which is one of channels established between the first terminal and the plurality of second terminals, has a lower value than a clear channel threshold.

19. A signaling method for a relay terminal that relays direct communication between a first terminal and a second terminal, the signaling method comprising:
receiving a relay request message requesting relay information from the first terminal; and
generating a response message that includes a first field indicating a flow for use by the second terminal or the relay terminal,
transmitting said response message responding to the relay request message to the first terminal through the relay terminal as a relay response message.

20. The signaling method of claim 19, further comprising:
transmitting the relay request message to the second terminal; and
receiving the relay response message including the field from the second terminal.

21. The signaling method of claim 19, wherein
the relay request message comprises a field indicating "Flow Establishment Request for Token Handover", and
the relay response message further comprises a field indicating "Flow Establishment Confirm for Token Handover".

22. A signaling method for a relay terminal that relays direct communication between a first terminal and a plurality of second terminals, the signaling method comprising:
receiving a token handover message for handing over a token from the first terminal;
transmitting a token advertisement message for announcing a token to the plurality of second terminals;
generating a token request message that includes a field indicating a flow for use of a third terminal or the relay terminal, said third terminal being one of said plurality of second terminals;
receiving said token request message from said third terminal; and
transmitting a token response message responding to the token request message to the third terminal.

23. The signaling method of claim 22, further comprising transmitting a link establishment command message including the flow to the plurality of second terminals and the third terminal.

24. The signaling method of claim 22, further comprising:
setting up new multicast relay connection by the relay terminal; and
establishing the flow indicated by the first field, said flow being used for the third terminal after acquiring the token.

* * * * *